Figure 1:
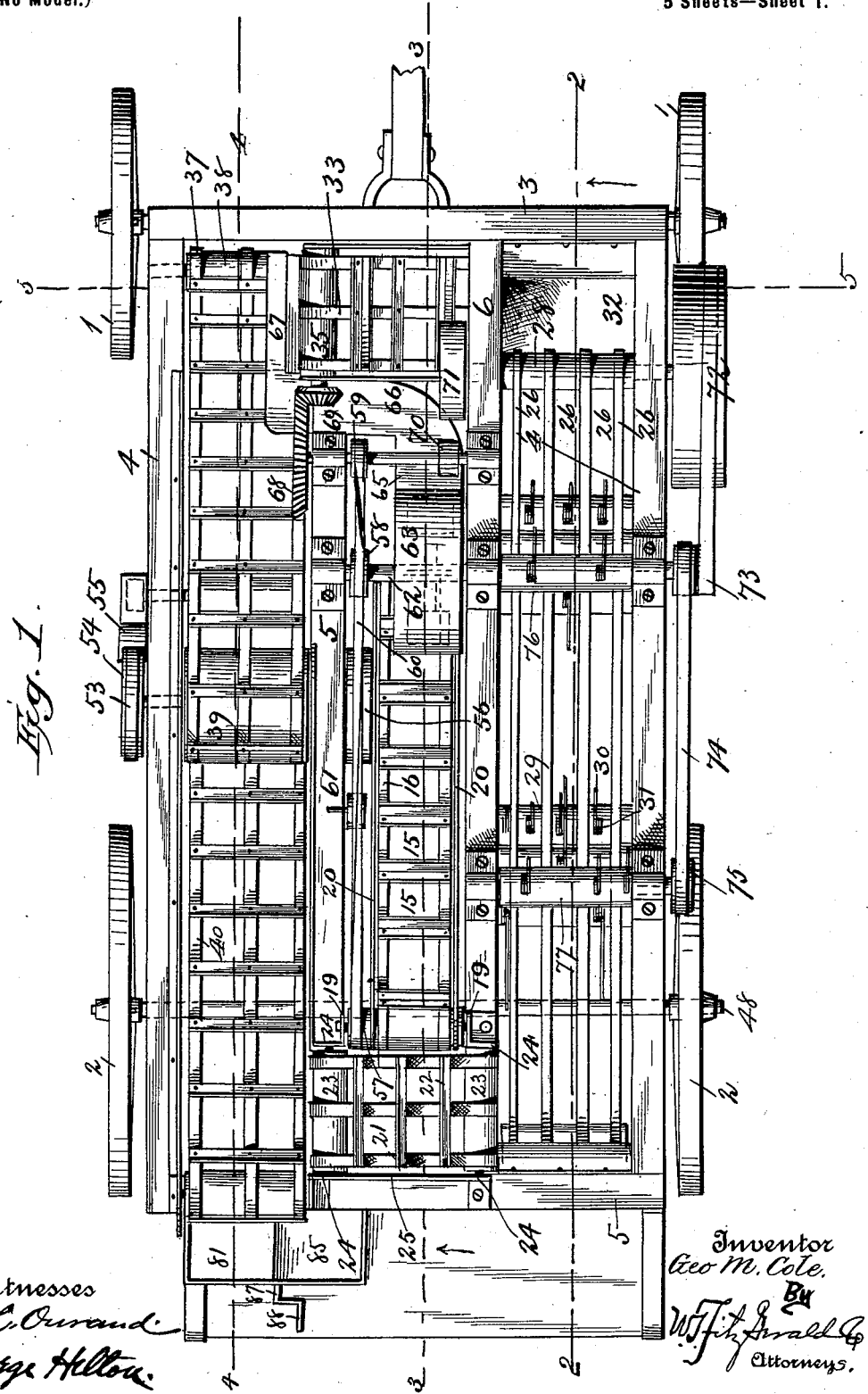

No. 674,602. Patented May 21, 1901.
G. M. COLE.
POTATO DIGGING MACHINE.
(Application filed Dec. 29, 1900.)
(No Model.) 5 Sheets—Sheet 1.

Witnesses
F. L. Durand
George Hilton

Inventor
Geo. M. Cole.
By
W. J. Fitzgerald
Attorneys.

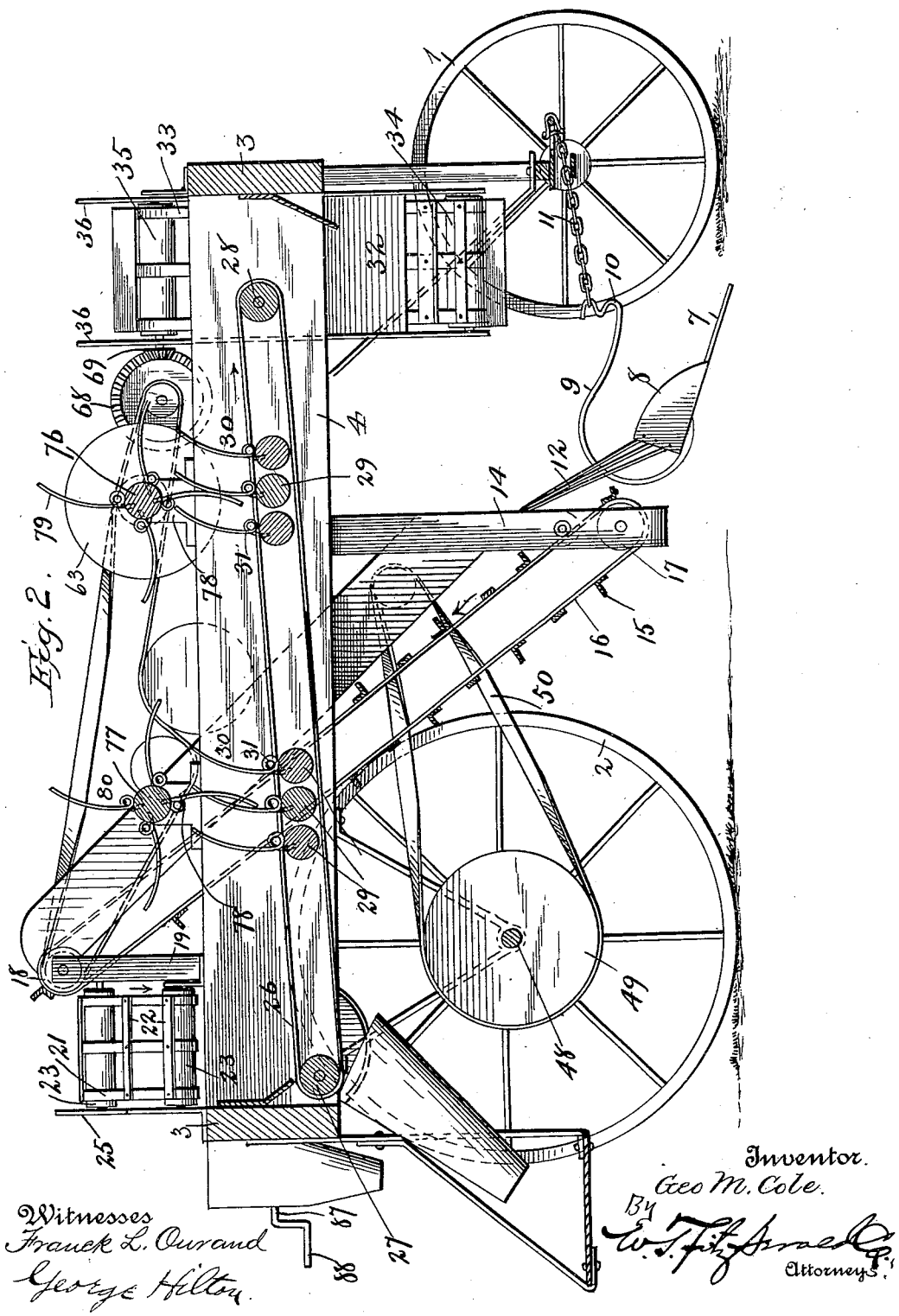

No. 674,602. Patented May 21, 1901.
G. M. COLE.
POTATO DIGGING MACHINE.
(Application filed Dec. 29, 1900.)
(No Model.) 5 Sheets—Sheet 3.
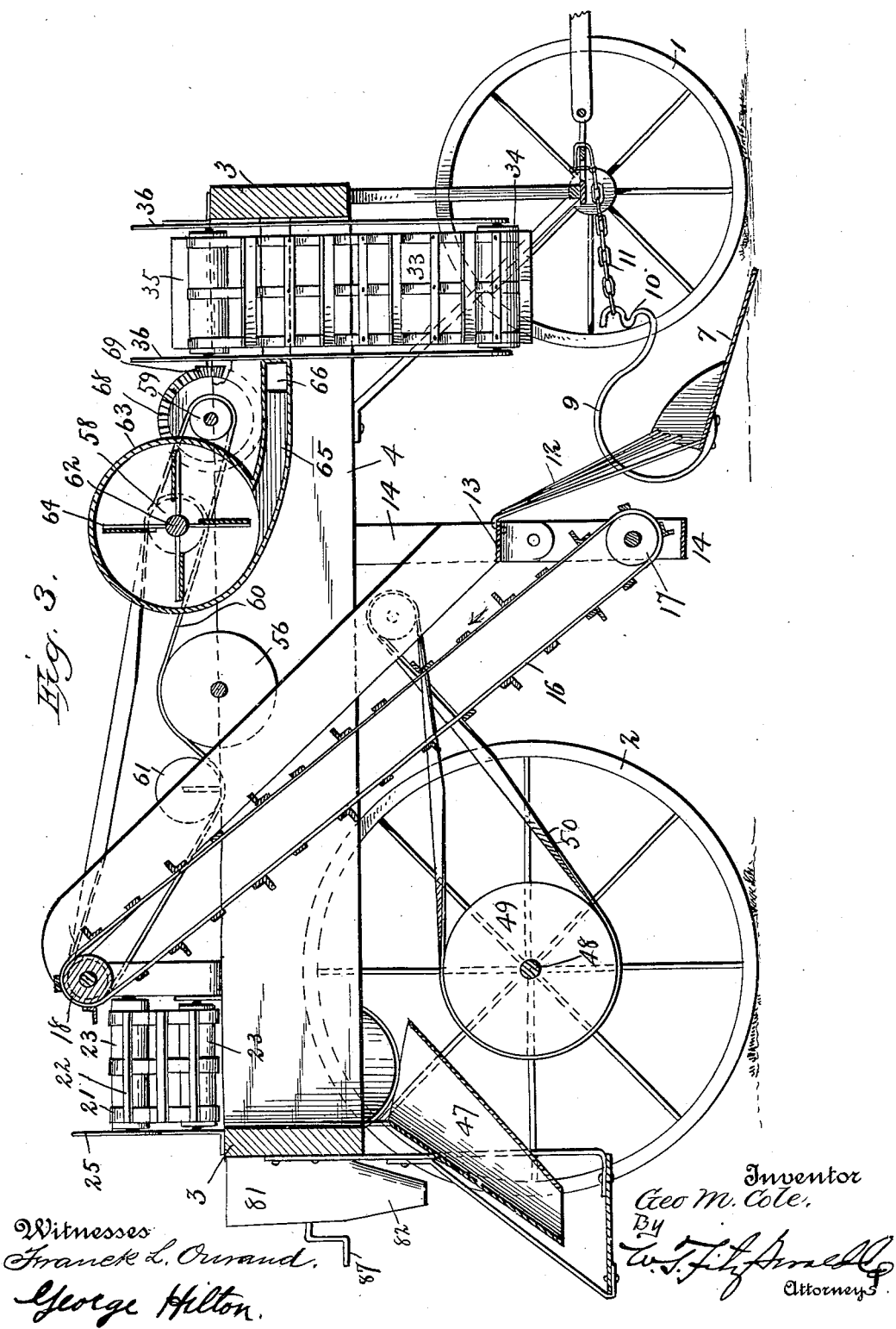

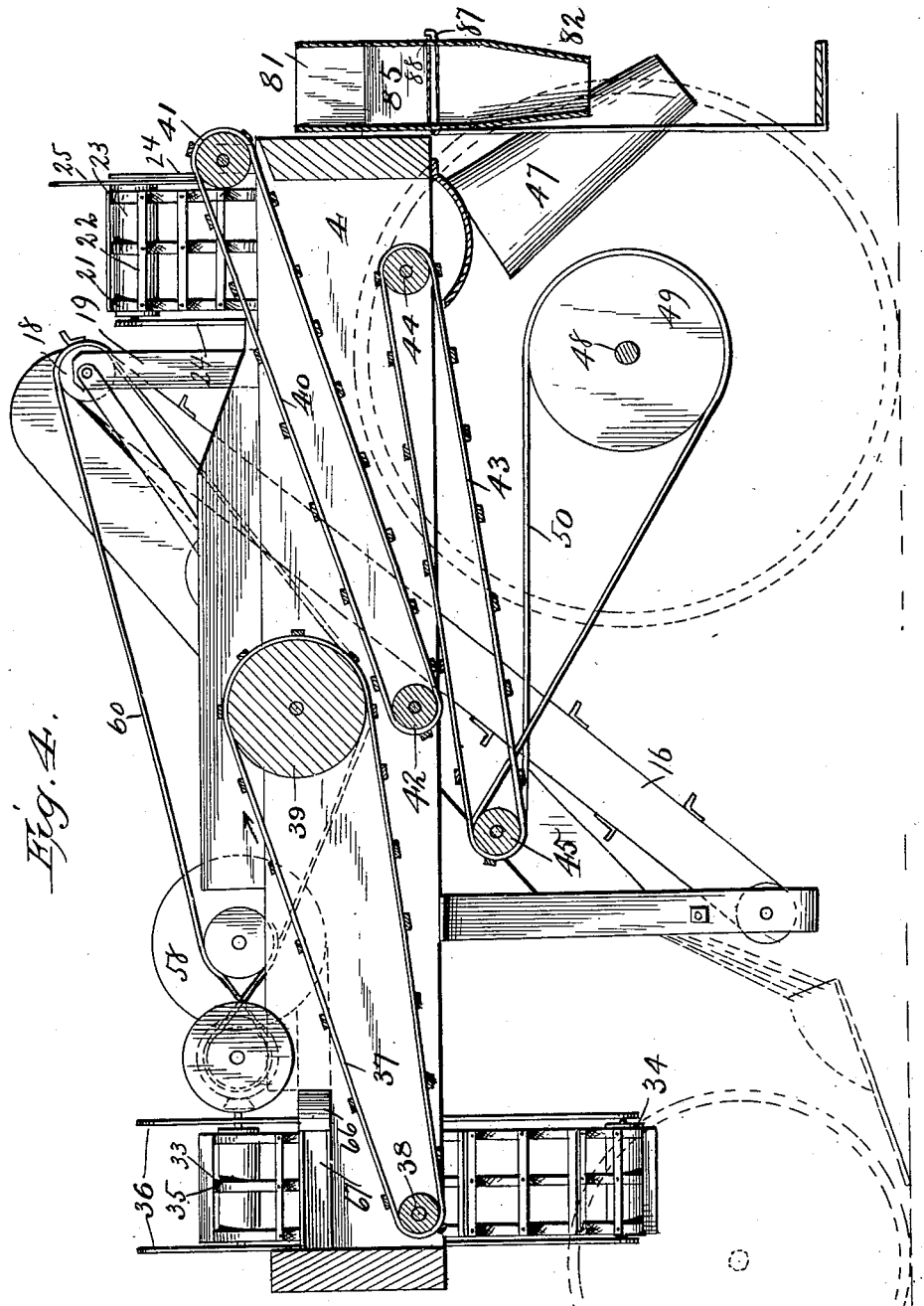

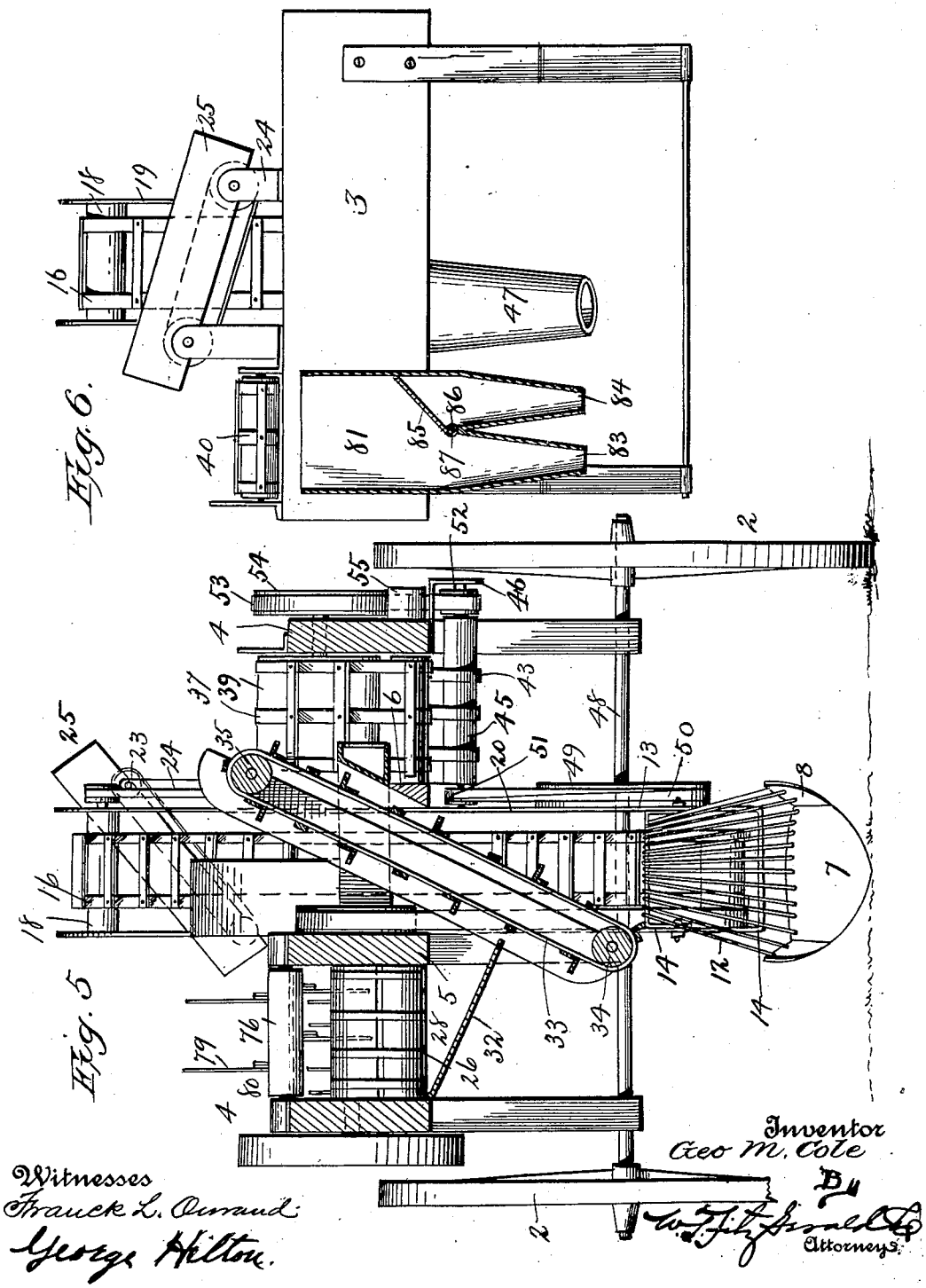

UNITED STATES PATENT OFFICE.

GEORGE M. COLE, OF COLOMA, MICHIGAN.

POTATO-DIGGING MACHINE.

SPECIFICATION forming part of Letters Patent No. 674,602, dated May 21, 1901.

Application filed December 29, 1900. Serial No. 41,513. (No model.)

*To all whom it may concern:*

Be it known that I, GEORGE M. COLE, a citizen of the United States, residing at Coloma, in the county of Berrien and State of Michigan, have invented certain new and useful Improvements in Potato-Digging Machines; and I do hereby declare the following to be a full, clear, and exact description of the invention, such as will enable others skilled in the art to which it appertains to make and use the same.

My invention relates to a potato digging and cleaning machine; and it consists of certain novel features of combination and construction of parts, the preferred materialization whereof will be fully described in the following specification and pointed out in the claims.

The object of my invention is to provide a machine which will not only remove potatoes and other similar vegetables from the ground, but will also cleanse the same of adhering soil and will in addition sort or grade the potatoes, so that those of smaller size will be placed in one receptacle, while those of a larger size will be separately delivered.

In the accompanying drawings, Figure 1 is a top plan view of my invention complete ready for use, showing the tongue of the carrying-vehicle broken away. Fig. 2 shows a vertical longitudinal section on line 2 2 of Fig. 1. Fig. 3 is a central longitudinal section taken on line 3 3 of Fig. 1. Fig. 4 is a view in longitudinal section taken from the opposite side, the line of division being indicated by 4 4 of Fig. 1. Fig. 5 shows a front elevation of the machine, the end of the framework being removed, while Fig. 6 shows a rear elevation of the machine complete.

Briefly described, my invention consists in certain mechanism designed to plow up the row of potatoes and lift the same out of the soil, at the same time permitting the soil to drop downward through certain wire guides or meshed carriers, and thence be delivered to endless belts provided with carrying-pockets, and thence carried over other endless belts provided with cleansing devices or fingers, and finally delivered in an assorted and cleansed condition in sacks or other receptacles located at the rear end of the machine.

Referring in detail to the construction illustrated in the drawings, 1 and 2 designate, respectively, the front and rear carrying-wheels, said wheels being designed to carry the supporting-framework, the end sections whereof are indicated by the numeral 3, the side sections being designated by the numeral 4, while 5 and 6 designate intermediate portions of the framework, designed to provide bearing-seats for the various working parts of the mechanism employed.

In order that the potatoes or other roots may be lifted out of the soil, I provide the uprooting device or plow-section 7, preferably provided with the side wings 8, whereby a chute-like lifting device or shovel will be formed, which is held in its operative position by the beam 9, which is attached to the rear part of the blade or shovel section 7 and is curved upward and extended forward, the extreme front end thereof being provided with the curved or corrugated vertical stem 10, designed to permit one of the links of the chain 11 to be attached thereto, said chain being secured to the middle portion of the axle.

Connected at regular intervals throughout the rear edge of the shovel or blade 7 are a series of rods 12, which extend upward, where their rear ends are firmly secured to the yoke 13, which is mounted upon or carried by the depending bracket 14, which latter consists, preferably, of a single piece of suitable material bent upon itself to form the U-shaped device, as illustrated in Fig. 5. The object of the members or rods 12 is to permit the potatoes or other roots to ride upward thereon and be received by the pockets 15 upon the endless belting 16, the latter being properly mounted in its operative position upon the rollers 17 and 18, the former being properly journaled in the lower end of the bracket 14, while the roller 18 is journaled in the standards 19, as more clearly shown in Fig. 1.

It will be understood that the width of the belting 16, and the consequent length of each of the pockets 15, shall be coincident with the width of a suitable chute provided for said belting, the walls 20 of said chute being secured in any suitable manner between the partitions 5 and 6. The endless belting 16 will deliver the contents of its series of pockets upon the endless belting 21, likewise provided with the series of pockets or ribs 22, the said belting being operatively mounted upon rollers or shafts 23, the latter being suitably mounted in the standards 24, properly held in position upon a contiguous part of the framework. The belting 21 is also disposed within a chute formed by the side walls or members 25 in order that the load carried by the pockets or ribs 22 may not casually fall off one side of the same. The belting 21 is inclined, so that any surplus load thereon not engaged by the pockets or cleats 22 will roll down upon the endless belting 26, which is mounted upon the carrying-rollers 27 and 28 and supported at intervals by the series of cross bars or shafts 29, as more clearly shown in Fig. 2. The shafts 29 are provided with a plurality of upwardly-extending fingers 30, formed of some yielding or spring metal, as a section of wire, each finger being properly bent upon itself to form the spring-loop 31 in order to permit the greatest degree of flexibility for said member, the object being to insure that said fingers will yieldingly permit a potato or other similar object to pass between them, though momentarily check a lump of soil, and thus holding said lump to be acted upon by the belting 26 and cause the same to become disintegrated and drop between the meshes of said belting.

By reference to Fig. 1 it will be seen that the belting in the present instance consists of a series of strips or belts, all of which are indicated by the numeral 26, a proper space being left between each two of the belts to insure that any small stones or particles of soil will drop downward to the surface of the ground. The endless belting (or series of belts) 26 delivers its load upon the inclined chute 32, which is fixed in position in any preferred way upon the forward end of the frame and inclined inwardly toward the endless belting 33, which latter is operatively mounted in position upon the rollers or shafts 34 and 35, each of said members being properly held in position by means of the standards 36, said standards also serving as a chute to prevent the load on the belt 33 from casually falling off to one side. The belting 33 is so disposed that it will be inclined outward and upward and deliver its load upon the belting 37, properly mounted upon the rollers or shafts 38 and 39, said rollers being properly journaled in suitable bearings in a contiguous part of the frame-sections 4 and 5, as will be seen by reference to Fig. 1. The belting 37 delivers its load upon the endless belting 40, carried by the rollers 41 and 42, each properly journaled between the members 4 and 5, as clearly shown in Fig. 4, while immediately beneath the endless belting 40 I dispose the endless carrier or belting 43, carried by the rollers 44 and 45, the former being journaled in suitable bearings in the members 4 and 5, while the latter is supported by a bracket 46 and by a contiguous part of the lower end of the chute or frame section 20, as will be seen by reference to Fig. 5. The endless belting 43 is so disposed that it delivers its contents into the open end of the conveyer chute or tube 47, the lower constricted end whereof is designed to be received by a sack, into which the potatoes are to be gathered, as will be readily understood.

It will be obvious that the meshing or construction of the different belting or endless carriers is such that the smaller potatoes and small particles of soil will freely drop through, and only the larger potatoes will therefore be delivered by each carrier to the next succeeding carrier, and it is therefore obvious that by the time the potatoes travel over all of the carriers they will be left in a very cleanly, desirable, and marketable condition and that no other preparation, as washing them, will be necessary.

The belting 21, being unconnected with the motive power, is left free as an idler, and it is therefore obvious that the load delivered thereon from the belting 16 will cause the belting 21 to freely turn the supporting-rollers 23 by action of gravity, the weight of the load thereon being all that is required to insure that the potatoes will be delivered by the belting 21 to the belting or series of belts 26.

I will now trace the preferred method of applying the motive power to the different carriers just described.

The axle 48 of the rear carrying-wheels is provided with the driving or master pulley 49, which is provided with a belt 50 or sprocket-chain, as preferred, which extends into communication with the pulley 51 upon the inner end of the roller 45, while the outer end of said roller is provided with the pulley or sprocket wheel 52, which by belting 53 or sprocket-chain is placed into operative relationship with the pulley-wheel 54, a suitable adjustable idler 55 being properly secured to the frame-section 4 in order that the desired degree of tension may be imparted to the belting 53, as will be readily understood. The pulley 54 is disposed upon the outer end of the shaft or journal of the roller 39, the inner end of said shaft being provided with the pulley-wheel 56, which communicates power to the pulleys 57, 58, and 59 by means of the belting or sprocket-chain 60, which latter extends from the pulley 59 to the pulley 57, the same being held in contact with the pulleys 56 and 58 by means of the adjustable idler-pulley 61, as clearly shown in Figs. 1 and 3. The pulley 58 is mounted upon the shaft 62, which is properly mounted in suitable bearings carried by the sections 5 and 6 of the framework. The shaft 62 is provided with a fan, which is disposed within the housing or casing 63, as will be seen in Figs. 1 and 3.

Any suitable variety of fan, as indicated by the numeral 64, may be used, it being understood that the housing 63 is removed upon its lower side and placed in connection with the blast-conveying chute 65, which extends forward and is thence curved laterally, as indicated by the numeral 66, and thence extended forward, as designated by the numeral 67, the object being to deliver the blast at a point between the delivery end of the belting 33 and the receiving end of the belting 37, thereby insuring that all dust and light chaffy particles will be effectively removed, leaving the potatoes thoroughly cleansed. The belting 33, as will be observed, is driven by means of the beveled gears 68 and 69, the former being attached to the shaft carrying the pulley 59, while the pulley 69 is mounted upon the extended end of the shaft 35. The opposite end of the shaft upon which the pulley 59 is mounted is provided with the pulley 70, designed to drive the pulley 71 upon the inner end of the shaft or roller 28, while the outer end of the shaft of the roller 28 has secured thereto the pulley-wheel 72, designed to drive the pulley 73, which latter is of sufficient width to accommodate the belting or sprocket-chain from the wheel 72 and also the belting 74, which extends into engagement with the pulley 75, the object being to rotate the shafts 76 and 77, said shafts being rotatably mounted in suitable brackets 78, disposed upon a contiguous part of the frame.

The shafts 76 are provided with a series of spring-like fingers 79, which are provided with the coil or loop members 80, similar to the loop-sections 31 of the fingers 30, it being understood that the fingers 79 are designed to coöperate with the fingers 30 and insure that any straw, weeds, or the like which may have been gathered and delivered thereto by endless belting will be completely broken and separated, so that the same may be efficiently acted upon by the fan, as previously explained. The larger potatoes are delivered from the carrier 40 directly into the conveyer-chute 81, which is of sufficient width to be coincident in extent with the width of said carrier, thereby insuring that the contents delivered from the carrier will be received by the chute and delivered to a sack or other receptacle (not shown) which may be placed in communication with the lower constricted end 82 of said chute.

By reference to Fig. 6 it will be observed that the lower end of the chute 81 is bifurcated, thus providing the inner and outer branches 83 and 84, respectively, and by reference to said last-mentioned view it will be seen that the operator may very readily cause the contents delivered to the upper end of the chute to enter either of said branches by means of the adjustable partition wall or plate 85, the lower end of which is properly pivotally secured or hinged in position at the point of union of said branch, as indicated by the numeral 86.

A suitable operating-shaft 87 is connected to the lower end of the partition 85 and provided with the controlling-handle 88, whereby the partition may be very readily adjusted in the desired position. By properly adjusting the chain 11 upon the corrugated or notched end 10 of the beam 9 the plow-section 7 may be so disposed that it will enter the earth any desired depth.

Having thus fully described the construction of my improved potato-digging machine, the operation thereof may be stated to be as follows: A suitable motive force may be secured to the tongue of the vehicle in the usual manner and the machine drawn over the ground, so that the plow-section 7 will follow one of the rows, or said section may be made of sufficient width to take up two of the rows at one time, if desired. The result will be that the potatoes and adhering soil will be forced upward upon the series of rods 12 and will from thence fall upon the carrier 16 and be delivered thereby to the carrier 21. The belting 21 being disposed upon the rollers 23 and said rollers being left to turn freely upon their journals, the load will insure that the belting will travel downward until the potatoes are delivered upon the carrier 26, on which they will travel through the fingers 30 to the inclined chute 32, it being understood that the fingers 79 will insure that trash or the like will be so broken that it may be readily removed by the action of the fan previously described. The potatoes will fall from the inclined chute 32 upon the carrier 33 and from thence be delivered to the carrier 37 after passing under the action of the blast delivered from the open outer side of the conveyer-chute 67. From the carrier 37 the potatoes will be delivered upon the carrier 40, it being understood that the larger potatoes will be delivered by the carrier 40 into the open mouth of the chute 81 and from thence be delivered through one of the branches 83 or 84, according to the position of the partition 85, the larger potatoes falling from the carrier 40 upon the carrier 43, which latter conveys the same into the chute 47.

While I have described the preferred construction and combination of elements deemed necessary to provide a complete operative machine of the character specified, it will be understood that I desire to comprehend in this application all substantial equivalents and substitutes, it being understood that various modifications or changes may be made without departing from the scope of my invention. Any desired material deemed most suitable for the purpose may be used in constructing the various elements, and, if preferred, the plow-section may be made of proper width to take up two rows of potatoes on each trip over the ground, as above indicated.

Having thus fully described my invention, what I claim as new, and desire to secure by Letters Patent, is—

1. In a potato-digging machine, the combination with a suitable frame, of a plow-section designed to uproot the potatoes; an elevating-carrier 16; means to connect the plow with said carrier whereby the potatoes will be delivered thereon; a series of carriers designed to supplement and coöperate with the carrier 16 whereby the potatoes will be conveyed to the desired point upon the vehicle, and a blower designed to free the potatoes from lighter particles of dirt or trash, all substantially as specified and for the purpose set forth.

2. In a potato-digging machine, a suitable frame and carrying-wheels therefor; a plow-section carried by the frame; means to adjust the plow-section whereby it will take deeply or lightly into the earth, in combination with a series of coöperating carriers and a blast-fan, and means to drive said parts, all substantially as specified and for the purpose set forth.

3. In a potato digging, sorting and cleaning machine, a suitable frame and carrying-wheels therefor; a plow adjustably mounted upon the frame; a plurality of endless carriers coöperating with each other and with said plow; a blast-fan and means to drive said carriers and fan whereby the blast will be delivered to the potatoes as they travel over said carriers and a receiving-chute having a partition-plate 85 and means to operate said plate whereby the contents directed into the chute will be delivered into either branch thereof as specified and for the purpose set forth.

In testimony whereof I affix my signature in presence of two witnesses.

GEORGE M. COLE.

Witnesses:
WM. H. BALL,
GRIEVE ELLIOT.